United States Patent
Taylor et al.

(10) Patent No.: US 7,374,026 B2
(45) Date of Patent: May 20, 2008

(54) PARKING BRAKE ASSEMBLY (75) Inventors: Martin Pors Taylor, Torfaen (GB); Mark Anthony Norman, South Wales (GB)

(73) Assignee: Meritor Heavy Vehicle Braking Systems (UK) Limited, Cwmbran, Gwent (GB)

( * ) Notice: Subject to any disclaimer, the term of this patent is extended or adjusted under 35 U.S.C. 154(b) by 124 days.

(21) Appl. No.: 11/127,795

(22) Filed: May 12, 2005

(65) Prior Publication Data

US 2005/0252735 A1   Nov. 17, 2005

(30) Foreign Application Priority Data

May 14, 2004   (GB) ................ 0410841.1

(51) Int. Cl.
*F16D 65/52* (2006.01)

(52) U.S. Cl. ............ 188/71.9; 188/72.8; 188/72.9; 188/72.6; 188/72.3; 188/72.7; 188/265; 188/156; 188/1.11 L; 188/1.11 E; 188/24.18; 188/70 R; 188/24.22

(58) Field of Classification Search ......... 188/72.7, 188/71.9, 72.3, 72.6, 72.9, 156, 265, 71.8
See application file for complete search history.

(56) References Cited

U.S. PATENT DOCUMENTS

| | | | |
|---|---|---|---|
| RE29,913 E | | 2/1979 | Case et al. |
| 5,568,845 A | * | 10/1996 | Baumgartner et al. ...... 188/71.9 |
| RE37,231 E | * | 6/2001 | Severinsson ............... 188/72.7 |
| 6,305,511 B1 | * | 10/2001 | McCann et al. ............ 188/265 |
| 6,311,808 B1 | | 11/2001 | Halasy-Wimmer et al. |
| 6,311,809 B1 | * | 11/2001 | Thomas et al. ............ 188/72.9 |
| 6,382,741 B1 | * | 5/2002 | McCann et al. ............ 303/191 |
| 6,659,235 B2 | * | 12/2003 | Ortegren et al. ......... 188/73.31 |
| 6,817,452 B2 | * | 11/2004 | Heinlein ................... 188/72.9 |
| 6,837,342 B1 | * | 1/2005 | Olschewski et al. ....... 188/72.8 |
| 2002/0117892 A1 | | 8/2002 | McCann et al. |
| 2004/0099491 A1 | * | 5/2004 | Stevenson et al. ....... 188/77 W |

FOREIGN PATENT DOCUMENTS

| | | |
|---|---|---|
| EP | 0 995 659 | 4/2000 |
| WO | WO 02/073058 | 9/2002 |

OTHER PUBLICATIONS

United Kingdom Search Report dated Aug. 25, 2004.

* cited by examiner

*Primary Examiner*—Robert A. Siconolfi
*Assistant Examiner*—Mahbubur Rashid
(74) *Attorney, Agent, or Firm*—Carlson, Gaskey & Olds

(57) ABSTRACT

A parking brake assembly for an air actuated disc brake includes an operating shaft for amplifying a force supplied by an air actuator and transmitting the force to brake pads. The operating shaft is pivotable about an axis between a rest position at which a braking force is not applied and an actuated position at which the braking force is applied. An abutment surface on the operating shaft is selectively engageable by a complementary latch of the assembly to retain the operating shaft in the actuated position and thereby apply the parking brake. The abutment surface has a helical configuration.

14 Claims, 8 Drawing Sheets

PARKING BRAKE ASSEMBLY

REFERENCE TO RELATED APPLICATIONS

This application claims priority to United Kingdom Patent Application 0410841.1 filed on May 14, 2004.

BACKGROUND OF THE INVENTION

The present invention relates generally to a parking brake assembly. More particularly, the present invention relates to a parking brake assembly for an air actuated disc brake.

Air actuated disc brakes are typically used in heavy vehicle applications, such as for braking trucks or buses. Such brakes typically operate as follows. Pressurised air is introduced behind a diaphragm of an air chamber, which generates a load in a push rod. The push rod in turn applies a force to a pivotably mounted operating shaft, causing it to rotate. By means of an eccentric action, an amplified force is applied to one or more tappet assemblies that advance a brake pad towards a brake rotor. This causes a clamping effect on the brake rotor, thereby retarding rotation of the rotor due to friction generated between the brake pad in contact with the tappet assembly and a further brake pad mounted on an opposite face of the brake rotor.

To comply with safety legislation, when a vehicle fitted with air actuated brakes is parked, the brakes must be applied mechanically without reliance on the pressurised air to overcome the risk of the brake force being removed due to accidental leakage of the air, with obvious consequences.

Conventionally, in air actuated brakes of the type described above, the parking brake function is achieved by the addition of a large spring to the rear of the air chamber that generates a load on the push rod when no pressurised air is present.

The addition of the spring, together with an additional air chamber required to release the parking brake that is mounted behind the air chamber for the application of service brakes, adds to the bulk, weight and expense of the vehicle braking system.

The present invention seeks to overcome, or at least mitigate, the problems of the prior art.

SUMMARY OF THE INVENTION

Accordingly, one aspect of the present invention provides a parking brake assembly for an air actuated disc brake including an operating shaft for amplifying a force supplied by an air actuator and transmitting the force to brake pads. The operating shaft is pivotable about an axis between a rest position at which a braking force is not applied and an actuated position at which the braking force is applied. An abutment surface on the operating shaft is selectively engageable by a complementary latch of the assembly to retain the operating shaft in the actuated position and thereby apply the parking brake. The abutment surface has a helical configuration.

A second aspect of the present invention provides a parking brake assembly for an air actuated disc brake including an operating shaft for amplifying a force supplied by an air actuator and transmitting the force to brake pads. The operating shaft is pivotable about an axis between a rest position at which braking force is not applied and an actuated position at which the braking force is applied. An abutment surface on the operating shaft is selectively engageable by a complementary latch of the assembly to retain the operating shaft in the actuated position and thereby apply the parking brake. The abutment surface is provided on the operating shaft intermediate first and second bearing surfaces of the operating shaft.

A third aspect of the present invention provides a method of applying a parking brake assembly of an air actuated disc brake including an operating shaft having a helical abutment surface and pivotable from a rest position to an actuated position. The method includes the steps of first applying a service brake to move the operating shaft to the actuated position and mechanically engaging a latch with the helical abutment surface of the operating shaft to retain the operating shaft in the actuated position to apply the parking brake.

These and other features of the present invention will be best understood by the following specification and drawings.

BRIEF DESCRIPTION OF THE DRAWINGS

Embodiments of the present invention will now be described, by way of example only, with reference to the accompanying drawings, in which.

DETAILED DESCRIPTION OF THE PREFFERED EMBODIMENT

Figure 1:
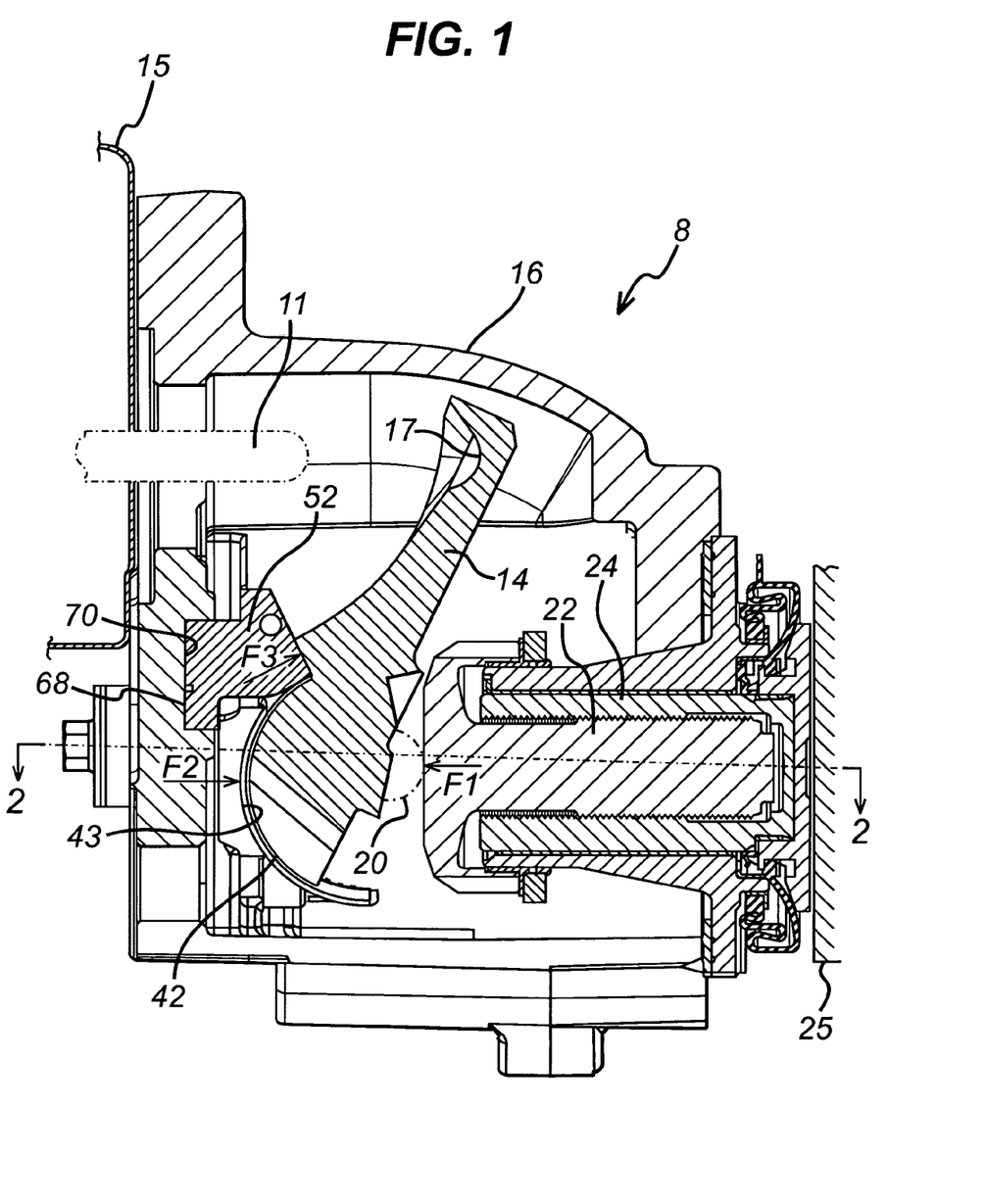
FIG. 1 is a cross-sectional view through a brake caliper according to one embodiment of the present invention.
Figure 2:
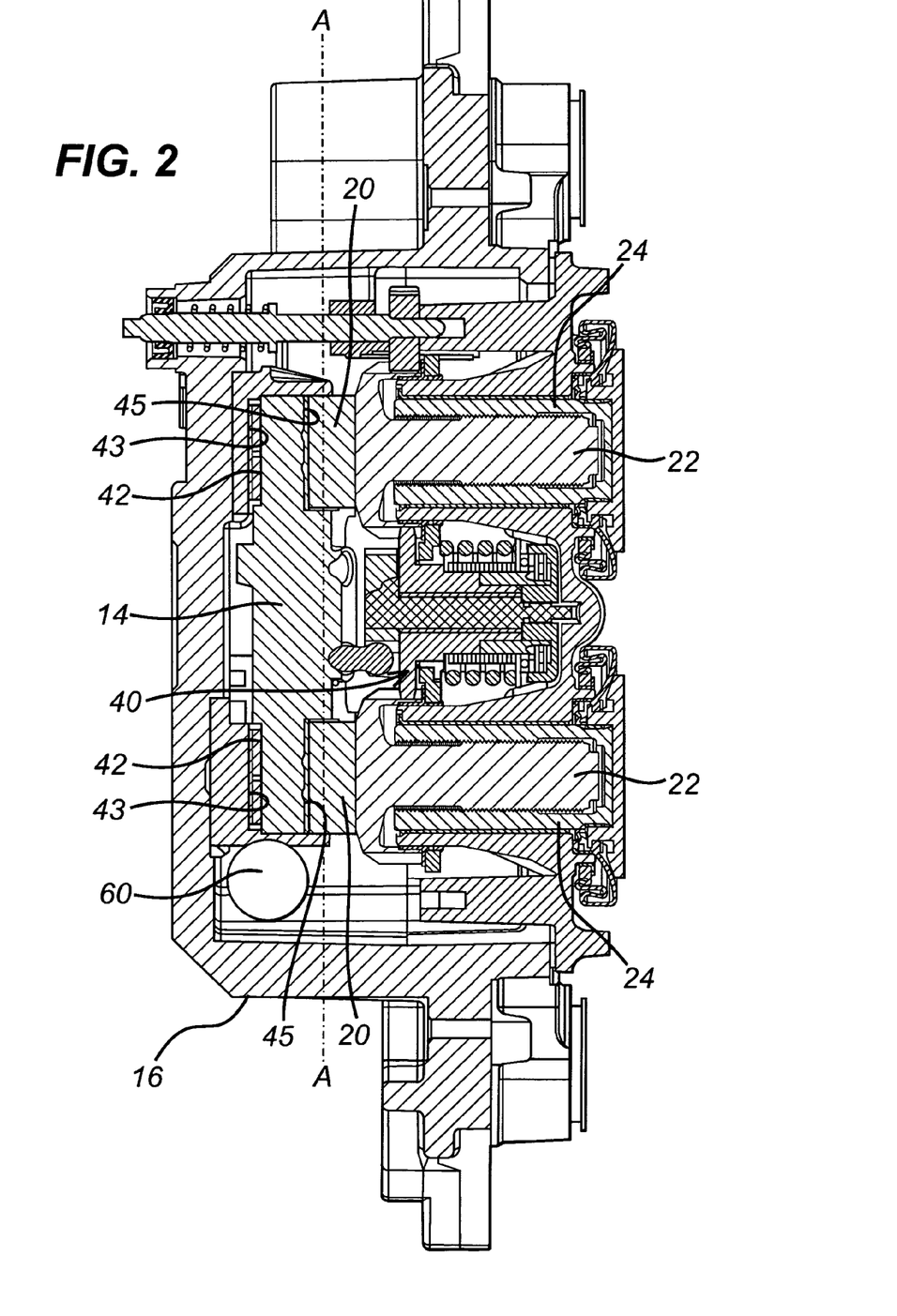
FIG. 2 is a cross-sectional view along the axis 2-2 of FIG. 1.

Referring to FIGS. 1 and 2, a brake 8 includes a caliper housing that straddles a disc or rotor (not shown). The caliper is typically mounted on an axle of the vehicle to be braked (not shown) and is slidable longitudinally relative to the axle. The rotor is mounted for rotation together with a wheel of the vehicle. The brake 8 is actuated by the introduction of pressurized air behind a diaphragm (not shown) of an air chamber 15. The diaphragm is connected to a push rod 11 that co-operates with a socket 17 at the radially outer end of an operating shaft or "op-shaft" 14 of the brake 8. An inner end of the op-shaft 14 has at its axially opposite ends arcuate bearing surfaces 42 seated in bearing seats 43 arranged at a lower end of an inner housing part 16 of the caliper to permit the op-shaft 14 to rotate about an axis A-A. The inner end of the op-shaft 14 is further provided with pockets 45 (FIG. 4) positioned eccentric to the op-shaft axis of rotation A-A which, upon rotation, causes a force to be transmitted to rollers 20. The rollers 20 in turn transmit the applied load to a pair of spaced inner tappet members 22. The inner tappet members 22 are screwed into engagement with associated outer tappet members 24, which apply the input load from the actuator to the rear of an inner brake pad 25, thus pressing the friction material of the brake pad into frictional engagement with the rotor.

A reaction force is generated through the frictional engagement between the rotor and the inner brake pad 25 that is fed back through the tappet members 22 and 24, the rollers 20 and the op-shaft 14 that is supported by the inner housing part 16. The inner housing part 16 is secured to an outer housing part (not shown). Thus, the applied force generated by movement of the op-shaft 14 is ultimately transmitted by reaction means to the outer housing part, which in turn presses an outer brake pad (not shown) into frictional engagement with the rotor. Therefore, the rotor, upon movement of the op-shaft 14, is clamped between the inner brake pad 25 and the outer brake pad to generate a braking force for braking the vehicle under control of the applied input movement from the push rod 11.

An adjuster mechanism i40 automatically takes up wear of the friction material of the brake pads by extending the outer tappet members 24 relative to the inner tappet members 22, as is well known.

Figure 3:
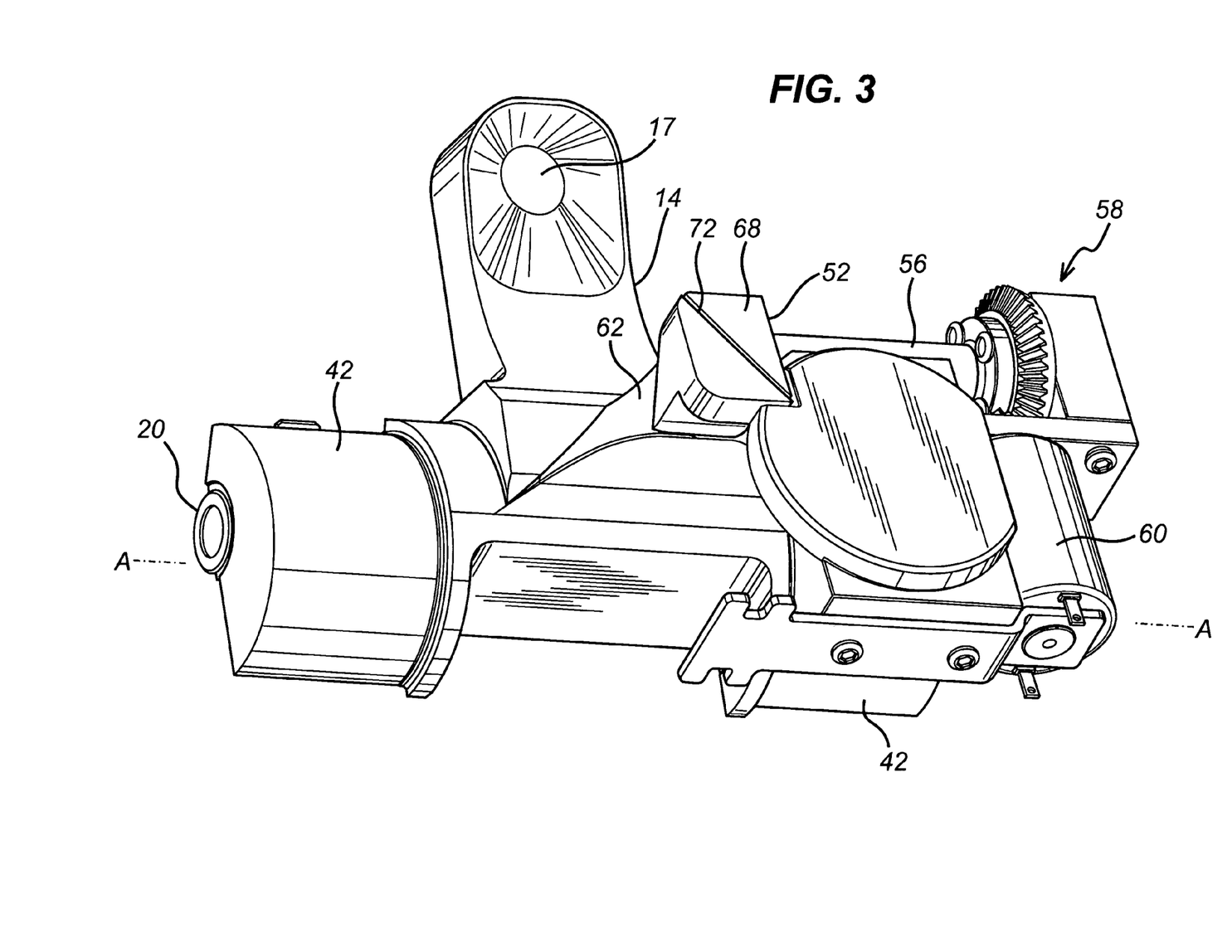
FIG. 3 is a perspective view of the operating shaft of FIGS. 1 and 2 illustrating the latching arrangement in a disengaged, retracted position.
Figure 4:
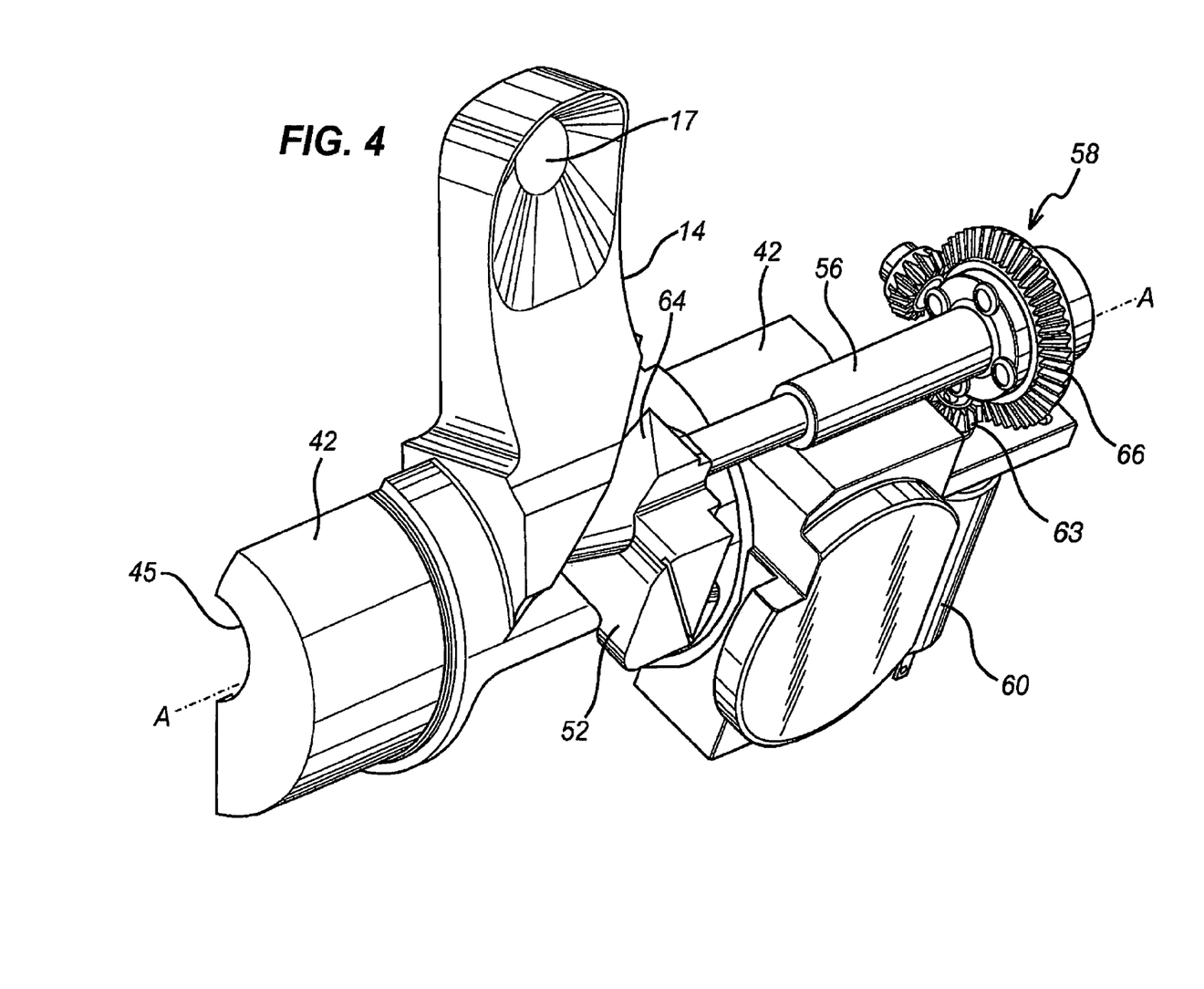
FIG. 4 is a perspective view of the operating shaft with the latching arrangement in an engaged, deployed position
Figure 5:
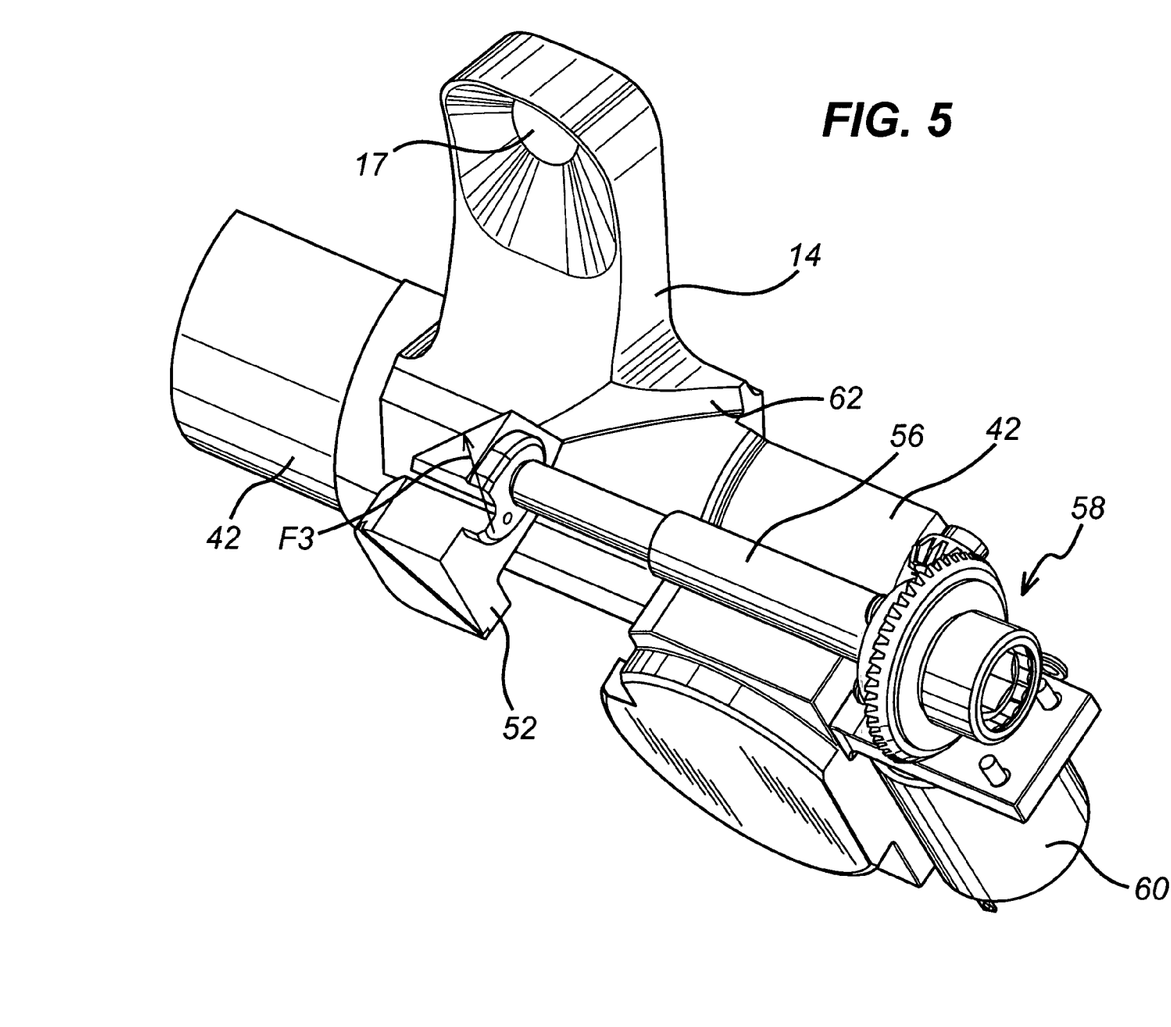
FIG. 5 is another perspective view of the operating shaft with the latching arrangement in an engaged, deployed position.

As can be seen most clearly from FIGS. 3 to 5, a helical formation centred on the axis A-A is provided on the op-shaft 14 axially intermediate bearing surfaces 42. The formation essentially includes a helical abutment surface 62 extending radially outwardly from the axis A-A.

A latch 52 of a parking brake assembly 58 is drivable in a direction parallel with the axis A-A by an electric motor 60 and reduction gear assembly including a pinion gear 63, a crown wheel 66 and a lead screw arrangement 56. The latch 52 includes a surface 64 angled to be complementary with the helical abutment surface 62 of the op-shaft 14 at whatever linear position the helical abutment surface 62 the latch 52 contacts. The more the op-shaft 14 pivots from the rest position, the greater the distance the latch 52 must be driven to contact the helical abutment surface 62. By positioning the helical abutment surface 62 between the bearing surfaces 42, it is possible for the op-shaft 14 to be latched over a wide range of angles. This is because the formation can extend over a wider range of angles with respect to the axis A-A than if it were, for example, located nearer the radially outer end of the op-shaft 14 due to the increased axial length of the op-shaft 14 at this position.

The latch 52 has a further support surface 68 that is slidably supported on a complementary surface 70 of the caliper inner housing part 16. The support surface 68 is preferably provided with a recess 72 to assist in lubrication between the surfaces 68 and 70.

When the latch 52 contacts the helical abutment surface 62, the op-shaft 14 is preventing from pivoting back to the rest position.

With the parking brake applied and the service brake not applied as shown in FIGS. 1, 4 and 5, the tappet inner assemblies 22 apply a force F1 on the rollers 20. The force is reacted by a force F2 of the bearing seats 43 and by a force F3 acting between the surface 64 of the latch 52 and the helical abutment surface 62 on the op-shaft 14, causing the op-shaft 14 to be maintained in the position shown in FIG. 1 and the brake 8 to remain applied.

In this embodiment, the force F3 has a component acting parallel to the axis A-A of the op-shaft 14. Due to the selection of the thread lead and thread form of lead screw arrangement 56, this component of force causes the lead screw to "lock" with the latch 52 in the applied position with no rotation of the lead screw occurring. Thus, when the latch 52 is in contact with the helical abutment surface 62, the op-shaft 14 is held in position by the latch 52 mechanically, without requiring an external source of power to maintain that position.

Figure 7:
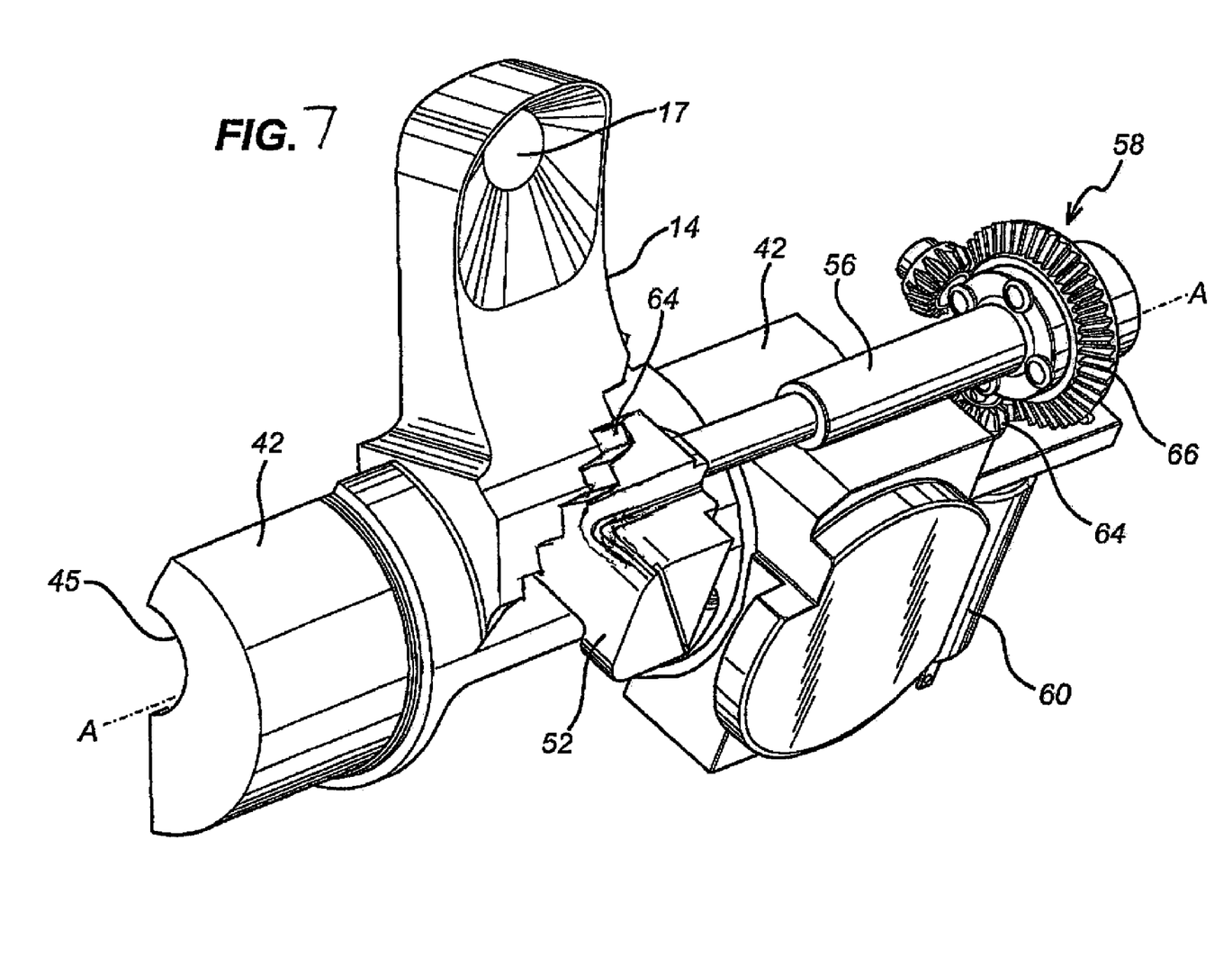
FIG. 7 is a perspective view of the operating shaft including a stepped abutment surface.
Figure 8:
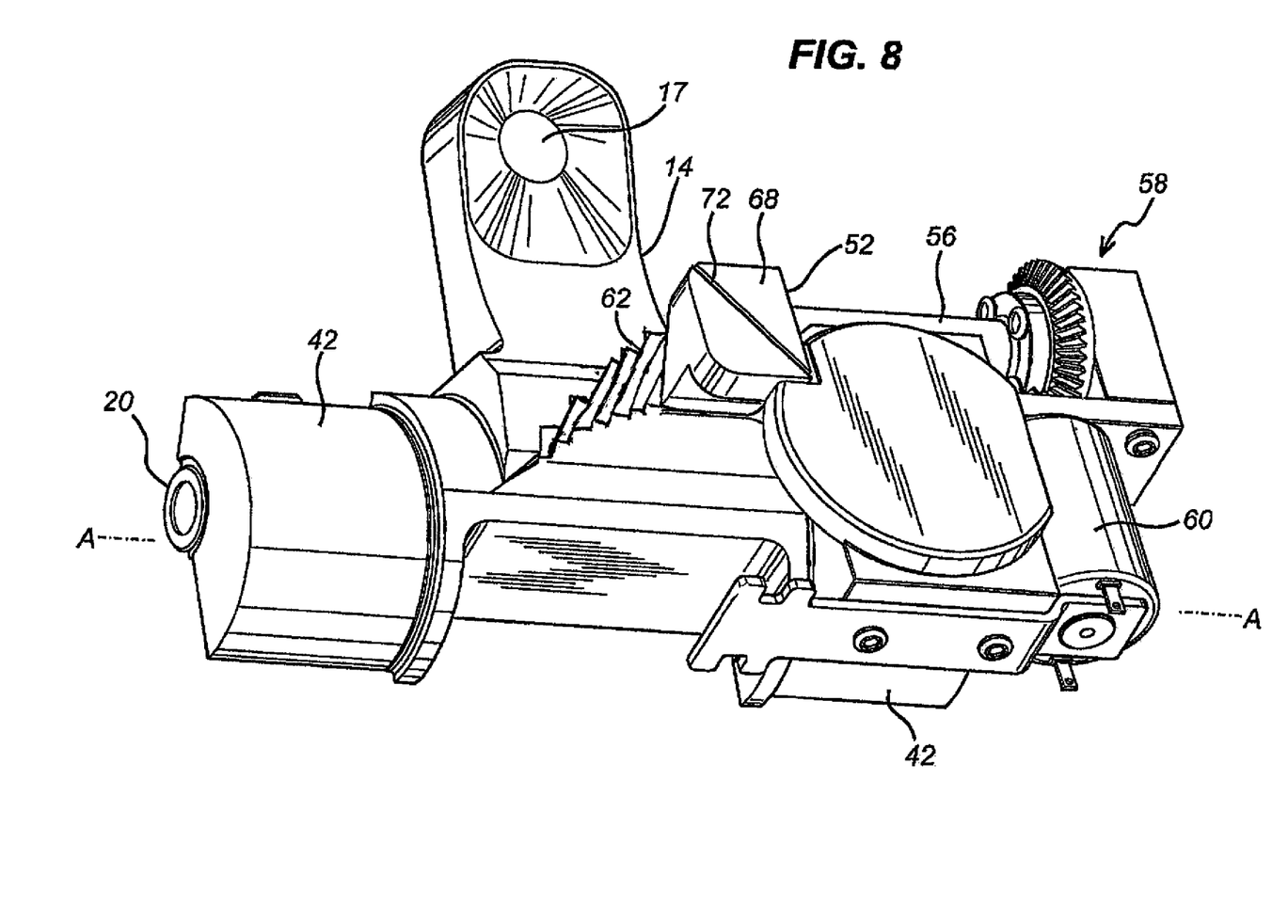
FIG. 8 is a perspective view of the operating shaft of FIGS. 1 and 2 illustrating the latching arrangement in a disengaged, retracted position and including a stepped abutment surface.

In another embodiment, gears 64 and 66 may be replaced by a non-back drivable worm and wheel-type gear arrangement to ensure locking. In further embodiments, the helical surface 62 on the op-shaft may be stepped (shown in FIG. 8), and the latch 52 having a matching stepped form (shown in FIG. 7), thereby preventing the generation of the force component parallel to axis A-A and causing the angular position of the op-shaft 14 to be locked. In a further alternative embodiment, a solenoid operated blocking member may be used to lock the latch in the required position.

Figure 6:
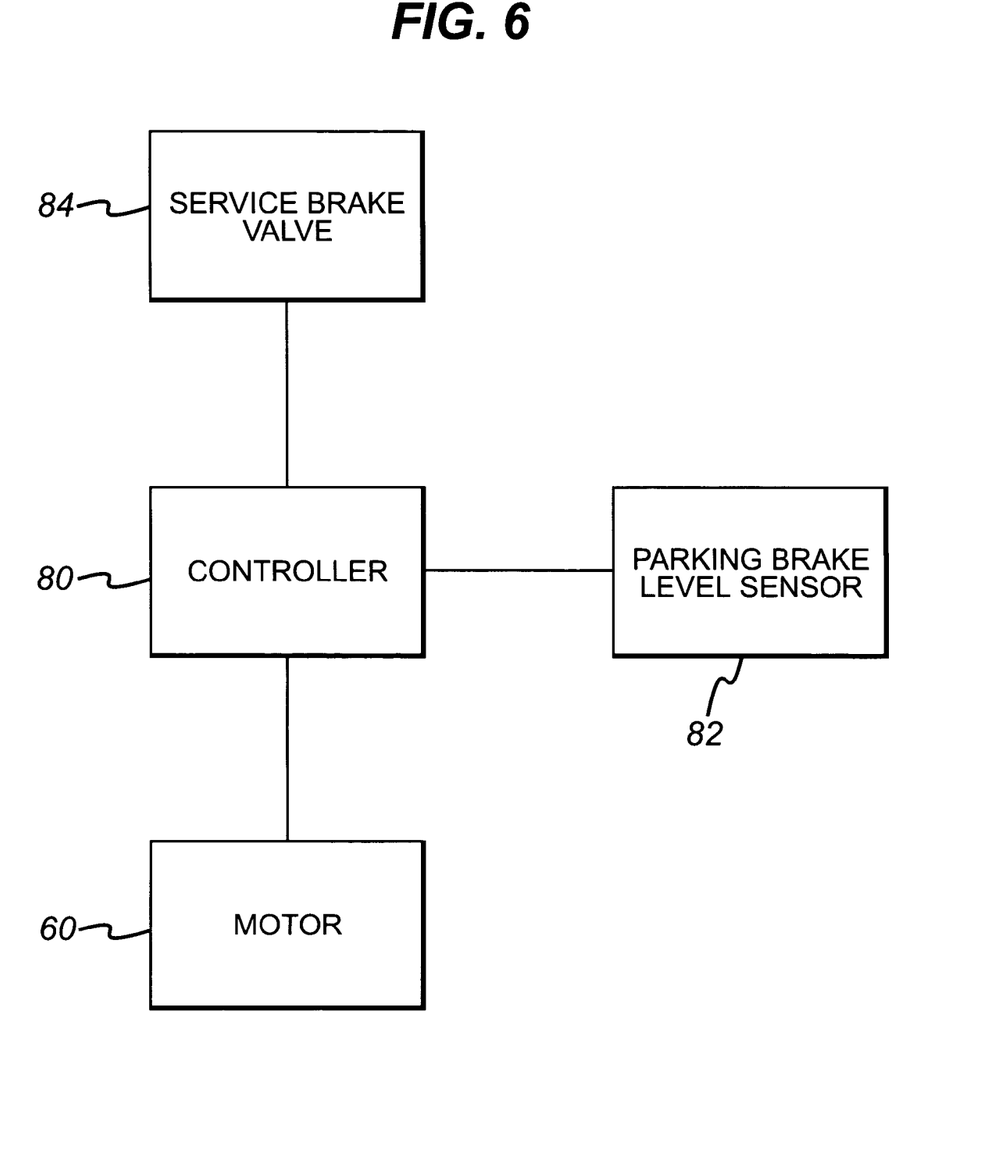
FIG. 6 is block diagram of a control system of the parking brake.

FIG. 6 illustrates schematically a control system for the parking brake assembly 58. The system includes a controller 80 that receives an input signal from a sensor 82 attached to a parking brake lever or switch (not shown) mounted in a vehicle cab or passenger compartment. The controller 80 is capable of signalling the opening and closing of a service brake air valve 84 to enable the application of the vehicle service brake and is also capable of signalling operation of a motor 60 of the parking brake assembly 58 to deploy or retract the latch 52. The controller 80 is preferably a microprocessor. The assembly may also be used in conjunction with control systems of the type disclosed in U.S. 2002/0117892 or EP 0995659.

Operation of the parking brake assembly is as follows. A vehicle user applies the parking brake using the parking brake lever or other input mounted in the passenger compartment, causing the sensor 82 to signal the controller 80. In accordance with pre-programmed logic in the controller 80, the controller 80 first signals the opening of the service brake air valve 84 to introduce air pressure behind the air chamber diaphragm, thereby causing the push rod 11 to actuate the op-shaft 14 and applying the service brake.

With the service brake applied, the controller 80 then signals the driving of the motor 60 to cause the latch 52 to advance into engagement with the helical abutment surface 62. Once the latch 52 contacts the helical abutment surface 62, the controller 80 signals the ceasing of the motor 60 drive in response to a detected change in motor current caused by the stalling of the motor 60. In other embodiments, alternative means of detecting when the latch 52 contacts the helical abutment surface 62 maybe employed, such as motor speed sensors or proximity sensors, for example. The application of the service brake prior to application of the parking brake minimizes the energy required to apply the parking brake and hence the size of the motor 60.

With the latch 52 contacting the helical abutment surface 62, the parking brake is now applied and the controller 80 signals the closing of the service brake air valve 84 to enable the service brake to be released. However, the parking brake assembly 58 remains applied.

When a vehicle user wishes to release the parking brake, the controller 80, in response to an input from the sensor 82, will first signal the application of the service brake before signalling the back-driving of the motor 60. Again, the initial application of the service brake minimizes the amount of force that must be supplied by the motor 60 to overcome the frictional forces between the helical abutment surface 62 and the surface 64, again enabling a smaller, more inexpensive and less powerful motor 60 to be used. In other embodiments, a more powerful motor 60 may be provided, thereby negating the need for the service brake to be applied before the parking brake is applied or released.

The present invention provides a compact, reliable and low-cost way of providing a vehicle parking brake that is both highly reliable and safe. The terms such as "inner" and "outer" as used herein are for ease of explanation, and should not be construed as limiting.

Numerous changes may be made within the scope of the present invention. For example, similar principles may be applied to various types of air or electrically actuated disc brakes such as ball and ramp (by having a helix centred on the axis of rotation), sliding rotor brakes and alternative means of moving the latch maybe employed, such as a rack and pinion arrangement. Alternative means may be used to drive the latch, such as a compressed air/pneumatic motor or hydraulic motor.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

The invention claimed is:

1. A parking brake assembly for a disc brake, the parking brake assembly comprising:
   an operating shaft including an operating shaft lever for amplifying a force supplied to a radially outer end of the operating shaft lever by a service brake actuator and transmitting the force to brake pads, wherein the operating shaft is pivotable about an axis at a radially inner end of the operating shaft lever between a rest position at which a braking force is not applied and an actuated position at which the braking force is applied, and the operating shaft includes an abutment surface; and
   a complementary latch, wherein the abutment surface is selectively engageable by the complementary latch to retain the operating shaft in the actuated position and thereby apply a parking brake, wherein the abutment surface has a helical configuration centered on the axis of the operating shaft, and wherein the complementary latch is linearly moveable between an engaged position and a disengaged position.

2. The parking brake assembly according to claim 1 wherein the abutment surface is stepped.

3. The parking brake assembly according to claim 1 further including a lead screw arrangement that provides linear movement of the complementary latch.

4. The parking brake assembly according to claim 3 wherein contact between the complementary latch and the abutment surface prevents the lead screw arrangement from back-driving.

5. The parking brake assembly according to claim 1 further including an electric motor to drive the complementary latch.

6. The parking brake assembly according to claim 1 further including a pneumatic motor to drive the complementary latch.

7. The parking brake assembly according to claim 1 wherein the parking brake includes a housing and the complementary latch is slidably supported on the housing.

8. The parking brake assembly according to claim 1 wherein the operating shaft includes a first bearing surface and a second bearing surface, and the abutment surface is provided on the operating shaft intermediate the first bearing surface and the second bearing surface.

9. A parking brake assembly for a disc brake, the parking brake assembly comprising:
   an operating shaft including an operating shaft lever for amplifying a force supplied to a radially outer end of the operating shaft lever by a service brake actuator and transmitting the force to brake pads, wherein the operating shaft is pivotable about an axis at a radially inner end of the operating shaft lever between a rest position at which a braking force is not applied and an actuated position at which the braking force is applied, and the operating shaft includes an abutment surface, a first bearing surface and a second bearing surface; and
   a complementary latch, wherein the abutment surface is selectively engageable by the complementary latch to retain the operating shaft in the actuated position and thereby apply a parking brake, and the abutment surface is provided on the operating shaft intermediate the first bearing surface and the second bearing surface, and wherein the complementary latch is linearly moveable between an engaged position and a disengaged position.

10. The parking brake assembly according to claim 9 wherein the abutment surface is helical and centered on the axis of the operating shaft.

11. The parking brake assembly according to claim 9 wherein the abutment surface is stepped.

12. The parking brake assembly according to claim 9 further including a lead screw arrangement that provides linear movement of the complementary latch.

13. The parking brake assembly according to claim 12 wherein contact between the complementary latch and the abutment surface prevents the lead screw arrangement from back-driving.

14. The parking brake assembly according to claim 9 wherein the parking brake includes a housing and the complementary latch is slidably supported on the housing.

* * * * *